United States Patent [19]

O'Neill

[11] 4,374,810
[45] Feb. 22, 1983

[54] RECOVERY OF FLUORINE FROM POND WATER OF WET PROCESS PHOSPHORIC ACID PLANTS AND RECYCLING OF DEFLUORINATED WATER

[75] Inventor: Padraic S. O'Neill, Baton Rouge, La.

[73] Assignee: Agrico Chemical Company, Tulsa, Okla.

[21] Appl. No.: 45,116

[22] Filed: Jun. 4, 1979

Related U.S. Application Data

[63] Continuation of Ser. No. 911,668, Jun. 1, 1978, abandoned.

[51] Int. Cl.³ .................... C01F 11/22; C02F 1/52
[52] U.S. Cl. .................... 423/160; 210/710;
210/711; 210/713; 210/726; 210/724; 210/906;
210/915; 423/163; 423/490
[58] Field of Search ............ 210/702, 710, 711, 712,
210/713, 724, 726, 738, 915, 906; 423/160, 158,
161, 167, 305, 163, 178, 490

[56] References Cited

U.S. PATENT DOCUMENTS 3,551,332 12/1970 Baumann et al. .................... 210/915
3,625,648 12/1971 Randolph .............................. 210/915
4,171,342 10/1979 Hirko et al. ........................... 210/702

FOREIGN PATENT DOCUMENTS 827305 7/1975 Belgium ............................... 210/915
51-38297 3/1976 Japan .................................. 210/915

OTHER PUBLICATIONS

Mooney G. A. et al., "Removal of Fluoride and Phosphorus from Phosphoric Acid Wastes with Two-Stage Lime Treatment"; Proceed. of the 33rd Waste Conf. Purdue Univ. (1978).

Primary Examiner—Benoit Castel
Attorney, Agent, or Firm—Richards, Harris & Medlock

[57] ABSTRACT

A process for obtaining calcium fluoride from the pond water of phosphoric acid plants and recycling the high phosphate defluorinated water to the pond is disclosed. Sufficient calcium carbonate is added to a solution having a pH of about 0.8, containing about 1% fluoride, 1% phosphate and less than 0.4% sulfate, to raise the pH thereof to 2-3, whereby calcium fluoride is precipitated as a major component, calcium phosphates and calcium sulfates are precipitated as minor components. The calcium fluoride precipitate obtained is washed with raw pond water to reduce the phosphate content and with ammonium carbonate solution to reduce the sulfate content. In this manner an industrially useful fluorspar is obtained. The low fluoride supernatant liquid is then mixed with sufficient raw pond water to bring the pH into the range 1.5-2.0 and the resulting suspension is then held in a lagoon for 5-21 days to permit separation of silica. After separation by sedimentation, the water containing unprecipitated phosphate is returned to the pond for further use. The silica-rich sediment may be further dewatered by centrifugation and used in the phosphoric acid plant to promote better recovery of fluoride. To minimize sulfate contamination of the calcium fluoride product, a separate pretreatment step may be provided to reduce the sulfate content of the pond water to approximately 0.4%. In this step, sufficient calcium carbonate is added to raise the pH of the pond water to about 2.0, and after adequate aging to cause precipitation of calcium sulfate with minimal precipitation of calcium fluoride which precipitates at a higher pH. After pretreatment, the suspension is treated by the first step of the process to remove calcium fluoride.

11 Claims, 3 Drawing Figures ated application Ser. No. 911,668 filed June 1, 1978, now abandoned.

RECOVERY OF FLUORINE FROM POND WATER OF WET PROCESS PHOSPHORIC ACID PLANTS AND RECYCLING OF DEFLUORINATED WATER

This is a continuation of application Ser. No. 911,668 filed June 1, 1978, now abandoned.

FIELD OF THE INVENTION

This invention relates to the recovery of useful products from waste water, and more particularly to the recovery of fluorine from the pond water of wet process phosphoric acid plants and the recycling of the phosphate-rich defluorinated waste water to the pond.

DESCRIPTION OF THE PRIOR ART

Many U.S. producers of wet process phosphoric acid operate a pond system whereby reactor scrubber liquids and evaporator barometric condenser waters are pumped along with gypsum slurry to a pond where the solid gypsum settles out. The supernatant is then recycled for further use in the plant. Various contaminants in the pond water, particularly fluoride and fluosilicate salts, reach steady-state concentrations determined by the various flows into and out of the pond and by precipitation when saturation is achieved. It has been the practice in certain plants to separate the functions of the pond water by using a two-pond system, one holding a less contaminated water used exclusively for evaporator cooling purposes and the other used for gypsum slurrying and process water. Cross mixing usually occurs to an extent to maintain water levels.

The quantities of byproduct fluoride potentially recoverable are enormous, according to the U.S. Bureau of Mines Report No. 8566 by Johnson, Sweeny and Lorenz. Up to 20% of the fluorine in the phosphate rock may be recovered as 20% fluosilicic acid by special scrubbers on phosphoric acid evaporators. Another 20-30% is lost in the gypsum byproduct. A further 20-30% usually remains in the product phosphoric acid. The remainder is at some time in the pond waters.

Attempts to tap this enormous fluorine resource have involved two approaches. One is to convert the dissolved fluoride which is present almost totally in the form of fluosilicate anion to anhydrous hydrogen fluoride. The second method involves the production of calcium fluoride, or a fluorspar, for use as a raw material for hydrogen fluoride manufacture or as a flux in the steel making industry.

The direct manufacture of anhydrous hydrogen fluoride from pond water involves precipitation of sodium fluosilicate from the recycled water, conversion of the sodium fluosilicate to 20% fluosilicic acid and the processing of this acid to anhydrous hydrogen fluoride in a multistep complex system. Because this approach is uneconomical, it has not gained general acceptance with manufacturers.

Various methods of recovering calcium fluoride from pure fluosilicic acid solutions are known in the art. German Pat. Nos. 2,307,897 to Spreckelmeyer, 2,533,128 to Schneider and Niederprun, 2,535,658 to Hellberg and Massonne and U.S. Pat. Nos. 2,780,523 to Gloss; 2,780,521 to Butt; and 3,923,964 to Kidde and 4,031,196 to Becher and Massonne disclose such processes.

The pond water of wet process phosphoric acid plants, however, typically contains other byproducts in addition to fluorides and silica, such as phosphates, sulfates and various metallic ions. As to the recovery of calcium fluoride from pond waters produced in the manufacture of phosphoric acid by the wet process, the prior art discloses two methods. U.S. Pat. No. 3,943,232 to Case details a process for treating pond water by heating it for 2-3 hours in contact with gypsum, thereby precipitating most of the fluoride as calcium fluoride. This approach is likely to be uneconomical because large volumes of water must be heated with consequently large energy requirements.

The second method disclosed in U.S. Pat. Nos. 3,725,265 to Legal and 3,551,332 to Baumann and Bird involves schemes for precipitating the fluorine and phosphorous components found in pond waters as two separate solids in the staged treatment of pond water with a lime solution. In the Legal process, the first contact between pond water and the lime solution brings the soluton pH to a value between 3 and 5 and results in a precipitate of mostly calcium fluoride, which is separated from the solution. The filtrate is then again treated with lime to yield a calcium phosphate product. The Baumann process is similar but emphasizes total removal of fluorides to produce a clean water for discharge or reuse. More recently, Belgian Pat. No. 827,305 to Hirko and Mills teaches a similar approach in which a waste water solution is treated with calcium carbonate and agitated for 5 minutes to bring the pH to about 2.0 without precipitation of calcium fluoride. In a second step, additional calcium carbonate is added to increase the pH of the solution to about 3, at which point the calcium fluoride precipitate may be recovered.

These procedures for extracting fluorine from the waste water of wet process phosphoric acid plants have been geared primarily toward the recovery of fluorine in the pond water. The phosphate-rich defluorinated pond water, however, has not been exploited as it could be for reuse in the pond. Moreover, a process for treating waste water solutions from wet process phosphoric acid plants has not heretofore been designed which will economically extract fluorine as calcium fluoride with minimum loss of phosphates, separate the silica from the defluorinated water and recycle the phosphate-rich waste water to the pond. It has not been shown either how pond waters containing high levels of sulfate ion might be processed so as to recover a commercially acceptable calcium fluoride.

SUMMARY OF THE INVENTION

The present invention is directed to an economical process for treating the waste water of wet process phosphoric acid plants to extract fluorine therefrom with minimum loss of phosphates, separate the silica from the waste solution and recycle the high phosphate defluorinated water back to the pond for reuse in the plant.

In accordance with the present invention, sufficient granular calcium carbonate is added to a waste water solution having a pH of about 0.8, containing about 0.5-1.5% fluoride, 1% phosphate and less than 1% sulfates, to increase the pH thereof to a value in the range 2-3 whereby calcium fluoride is precipitated as a major component. The calcium fluoride precipitate recovered is countercurrently washed with raw pond water to reduce the phosphate content thereof, and the suspension filtered to obtain an industrially useful fluorspar. The low fluoride water is then mixed with sufficient raw pond water to reduce the pH to a value in the range 1.5–2.0. This solution is then held in a lagoon for 5–21 days to permit separation of silica by settling and the supernatant phosphate-rich solution is returned to the pond.

In accordance with another aspect of the invention, additional calcium carbonate is added to the defluorinated water obtained after precipitating the calcium fluoride to raise the pH to a value in the range 7–10, whereby silica and some phosphates separate as a gelatinous precipitate. The gel is centrifuged to remove most of the silica and the supernatant is either returned to the pond or further treated with slaked lime or quicklime whereby the phosphate and fluoride content of the water is reduced to very low levels and the almost pure water may be safely discharged from the plant.

In accordance with yet another aspect of the invention, the waste water may be processed through a pretreatment stage, if necessary, to minimize the sulfate contamination of the calcium fluoride product. In this pretreatment step, sufficient granular calcium carbonate is first added to the waste water solution to raise the pH to a value less than 2.0. This solution is held for up to 24 hours whereby calcium sulfate will precipitate out largely free of fluoride. The waste water may then be processed to remove calcium fluoride by the addition of calcium carbonate.

DESCRIPTION OF THE DRAWINGS

For a more complete understanding of the present invention and further objects and advantages thereof, reference is now made to the following description taken in conjunction with the accompanying Drawings in which.

DESCRIPTION OF THE PREFERRED EMBODIMENT

In the present invention, waste water from a wet process phosphoric acid plant is treated with granulated calcium carbonate in a countercurrent staged precipitation and washing of calcium fluoride. Because the precipitation stage is carried out at low pH, a minimum quantity of phosphate is removed with solid yielding a final dry product containing 65–80% $CaF_2$, 4–10% $P_2O_5$ along with small quantities of coprecipitated calcium sulfate. Should the sulfate concentration in the raw pond water exceed 0.4%, a pretreatment stage in which the sulfate is reduced below this level is necessary. The low fluoride supernatant liquid containing unprecipitated phosphate and silica is processed through an aftertreatment stage in which the silica is removed or substantially reduced, and the resulting clarified phosphate-rich solution is returned to the pond for further use in the phosphoric acid plant. Thus, a good quality fluorspar is produced with minimum phosphate loss from the pond water and with minimum consumption of calcium raw material, a factor of major economic importance. The silica can be removed from the defluorinated waste water and the clarified phosphate-rich waste water can be returned to the pond for reuse.

It has been discovered that certain pond waters as obtained in the operation of a dual pond system in wet process phosphoric acid manufacture using Florida phosphate rock are particularly suitable for processing by the method of this invention. These waters used for evaporator cooling purposes will usually contain 0.5–1.5% F, 0.5–1.5% $P_2O_5$ and 0.1–1.0% $SO_4$. A fluoride to phosphate weight ratio in the water of one or greater is usually found and is desirable for optimum operation of this invention.

At lower concentrations of fluoride, recovery of fluorspar becomes economically unattractive due to the large volumes of pond water that must be processed per ton of product recovered, and the proportionately higher impurity contamination of the fluorspar. Fluoride concentrations in excess of 1.5% F, while giving a higher recovery of fluoride, lead to a more rapid separation of silica byproduct which can cause increasing problems at the fluorspar separation stage.

Figure 1:
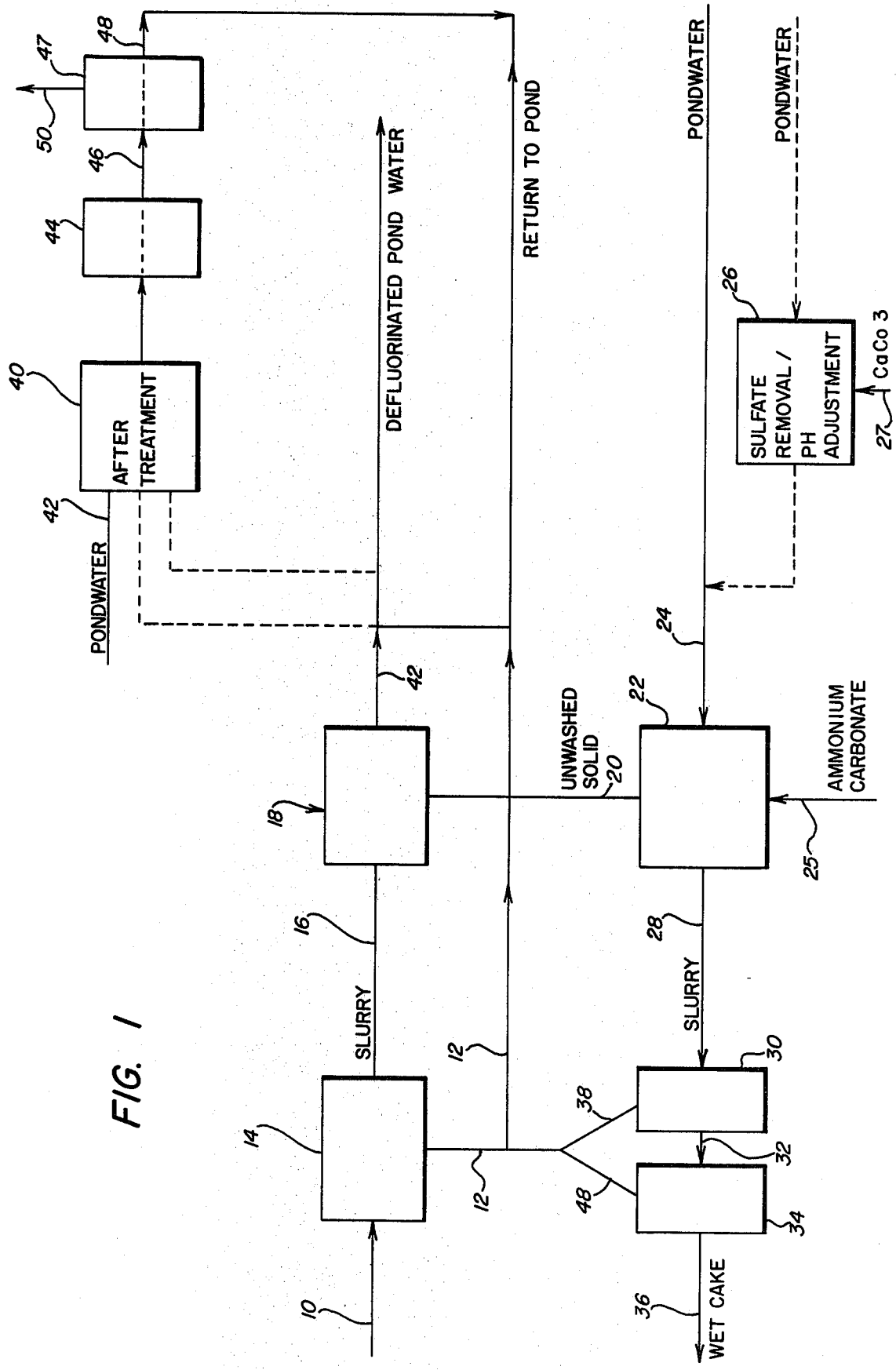
FIG. 1 is a block diagram illustrating the steps in a specific embodiment of the process.
Figure 3:
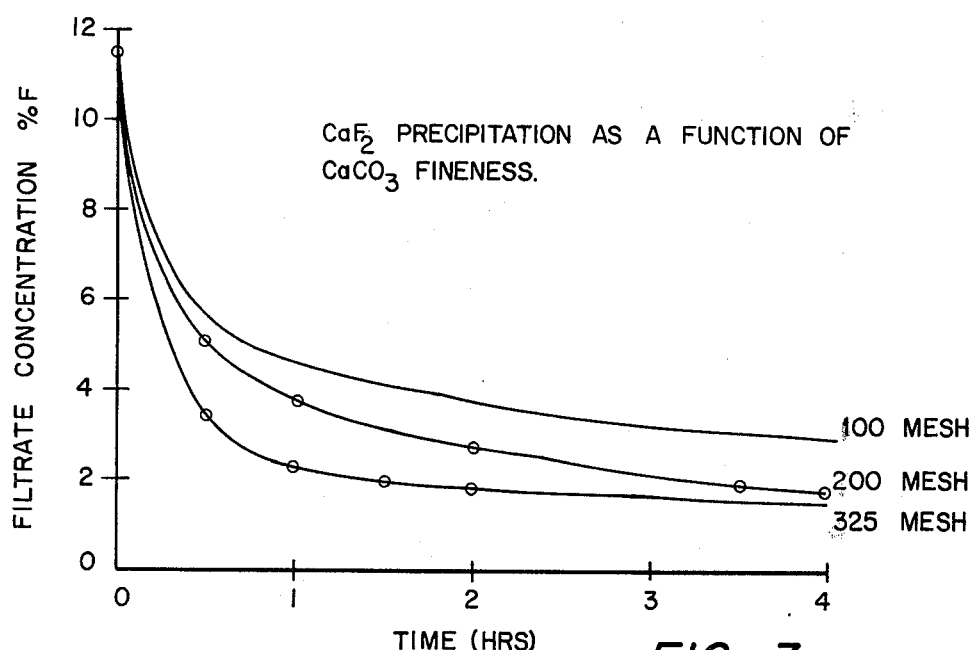
FIG. 3 is a graph illustrating the reactivity of calcium carbonate of various particle sizes with typical pond water.

FIG. 1 illustrates schematically the process of the present invention. Finely ground calcium carbonate designated by the numeral 10 is mixed with waste water 12 having a pH of about 0.8, containing about 0.5–1.5% fluoride, 1% phosphates and less than 0.4% sulfates. Sufficient calcium carbonate is mixed with the waste water in a mixing station 14 to produce a slurry 16 which has a pH somewhere in the range 2–3. Slurry 16 is then fed into a settler 18 where a precipitate containing calcium fluoride as a major component, and phosphates and sulfates as minor components separates. During the precipitation stage, the slurry is continuously agitated to a degree consistent with the fineness of the calcium carbonate added, the fluoride and phosphate content of the water, and the length of time necessary to produce a commercially acceptable fluorspar. The data in Table I and the graph in FIG. 3 below, illustrates the degree and length of agitation necessary to produce fluorspar of a given phosphate and fluoride content.

After agitation in the precipitation stage, the unwashed precipitate 20 containing calcium fluoride, phosphates and sulfates, is then passed to the washing stage where it is mixed in a mixing station 22 with the raw pond water 24 to reduce the phosphate content and with ammonium carbonate 25 to reduce the sulfate content thereof. If the pond water solution 24 is abnormally high in sulfates, i.e., above 0.4%, the water is first passed through a pretreatment station 26, whereby addition of calcium carbonate 27, the pH is increased from 0.8 to a value below the pH at which calcium fluoride precipitate begins to form in large quantities (approximately pH 2). The treated pond water 24 which results from the pretreatment stage has a sulfate content about 0.4% and is used to wash the calcium fluoride precipitate 20 to reduce the phosphate content thereof. Washing the precipitate with pretreated raw pond water is feasible because the solubility of the phosphates in this system increases as the pH drops.

The washed low phosphate slurry 28 is removed from mixing station 22 to a thickener 30, from which a thickened precipitate 32 is filtered at filter 34 to produce a fluorspar filter cake 36. The high phosphate wash liquor 38 is removed from thickener 30 and filter 34 and is either recycled to the pond, is mixed with calcium carbonate in the first mixing station 14, or used in an aftertreatment station 40.

After the precipitation stage in station 18 is complete, the low fluoride solution 42 containing unprecipitated fluoride and phosphates is passed to aftertreatment station 40 where it is mixed with a sufficient quantity of fluoride-containing waste water 42 to reduce the pH of the solution to 1.5-2.0. This fluoride containing waste water may be taken directly from the pond or, alternatively, may be phosphate-rich wash liquor 38. This solution is then fed to a second settler 44 where it is allowed to remain for 5-21 days, by the end of which time most of the silica sedimentates. The silica sediment 46 is then separated by a centrifuge 47 and the phosphate-rich supernatant 48 is pumped back to the pond. The centrifuged sediment 50 is then discharged onto the gypsum pile or used in the phosphoric acid plant.

Treatment of dilute fluosilicic acid solutions with any source of calcium oxide, limestone, hydrated lime, lime solution, or quicklime gives rise to rapid precipitation of calcium fluoride according to the equation:

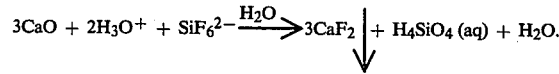

Absent the modifying effects of certain minor constituents such as sulfate and aluminum ions as taught in U.S. Pat. No. 4,031,193 and carbonate ions, as is generally known, the precipitate obtained tends to be gelatinous. A factor of considerable importance in the production of calcium fluoride precipitates and the separation of silica thereform is the fairly rapid separation of by-product silica according to the equation:

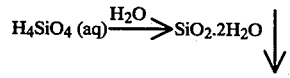

Figure 2:
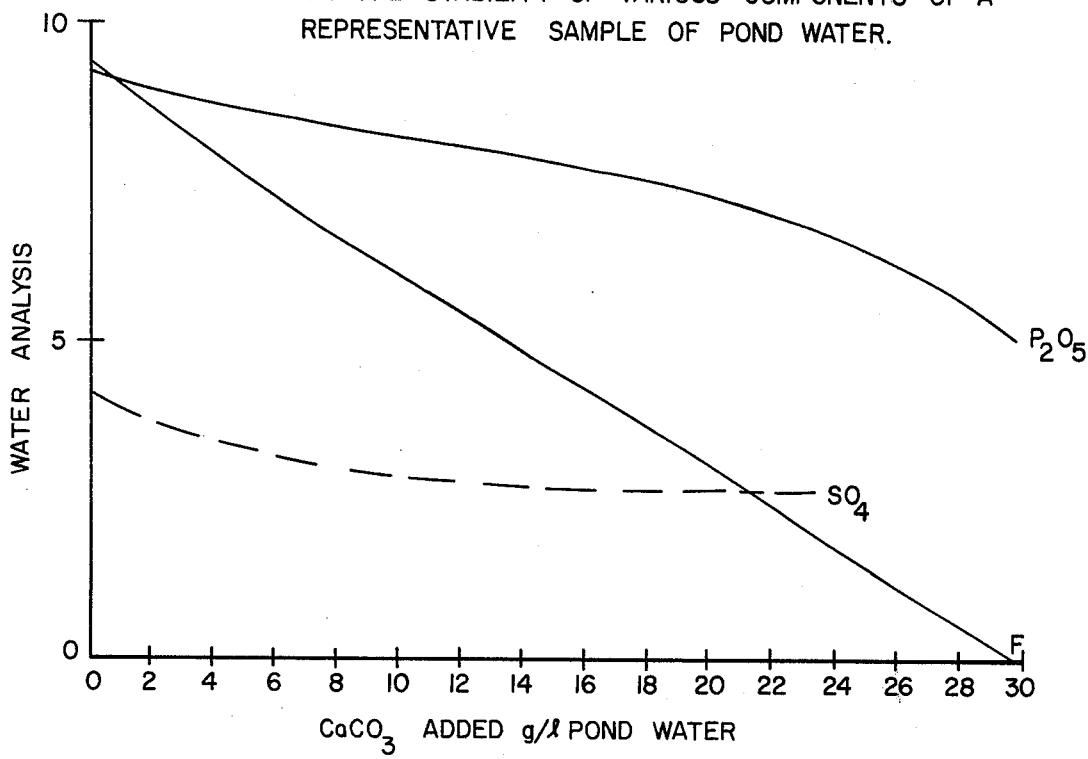
FIG. 2 is a graph illustrating the effects of the addition of calcium carbonate on the solubility of various components of a representative pond water sample.

In the pure fluosilicic acid/water system, the silica emerges as a gel almost as quickly as the calcium fluoride precipitates. However, when contaminated phosphoric acid pond waters are used as a source of fluosilicic acid, the phosphate ions present act as a buffering agent and it is possible to precipitate natural quantities of calcium fluoride at pH 2-3. At this level of acidity the silica is stable in solution for a long time (3-7 days), as described by R. K. Iler in Chapter 2 of his book *The Chemistry of Silica and Silicates,* (Cornell University Press 1955), and the calcium fluoride may be separated with very little contamination or interference by silica. The effect of various levels of addition of calcium carbonate on the soluble components of a representative pond water sample is shown in FIG. 2. Optimum conditions for precipitation allow recovery of 80-90% of the fluorine in the water as calcium fluoride.

The use of carbonate as a source of calcium has two advantages. Chemically, it leads to a more readily separated precipitate; economically, it is the cheapest source of calcium. An additional minor advantage is the agitation of the reaction medium provided by effervescence due to the evolution of carbon dioxide. The carbonate may be in the form of ground limestone or crushed oyster shell.

As might be expected, the calcium carbonate must be finely ground in order to react quickly and fully with the pond water. The reactivity of ground oyster shell of varying fineness with various pond waters at 35 degrees C. is shown in Table I.

TABLE I

| Pond Water Analysis | | | CaCO$_3$ Added | Fineness | Residence Time | g/l | Product Ppt. | | | |
|---|---|---|---|---|---|---|---|---|---|---|
| % F | % P$_2$O$_5$ | % SO$_4$ | g/l | | (hrs.) | dry | % CaF$_2$ | % P$_2$O$_5$ | % SO$_4$ | % CaCO$_3$ |
| 0.993 | 0.688 | 0.400 | 27 | 325 | 1.5 | 25.5 | 72.0 | 8.96 | 6.60 | |
| 0.993 | 0.688 | 0.400 | 27 | 200 | 1.5 | 19.5 | 61.3 | 5.45 | 8.83 | |
| 0.993 | 0.688 | 0.400 | 27 | 200 | 3.0 | 27.2 | 68.9 | 6.61 | 6.53 | |
| 0.920 | 0.940 | — | 24 | 100 | 2.0 | 23.9 | 46.5 | 4.72 | | 30.1 |
| 0.993 | 0.688 | 0.400 | 18.9 | 200 | | | | | | |
| | | | 8.1 | 325 | 2.5 | 26.8 | 68.3 | 6.89 | 9.63 | |
| 0.989 | 0.689 | 0.420 | 25.3 | 325 | 1.0 | 25.2 | 71.1 | 8.57 | 6.37 | |
| 0.954 | 0.691 | 0.400 | 25.5 | 325 | 1.2 | 25.0 | 70.2 | 8.97 | 5.76 | |
| 0.948 | 0.692 | — | 25.6 | 200 | 3.5 | 24.0 | 58.7 | 6.50 | — | 13.8 |

The first five entries of Table I refer to batch experiments.
The last three entries were obtained on a continuously operating pilot-plant. Analysis of the solid was carried out on product dried to constant weight at 100° C. Fineness refers to 100% of sample passing a screen of specified mesh.

Good agitation is vital to the precipitation and washing stages. Otherwise the carbonate particles have a tendency to become covered with precipitated product, thereby inhibiting further progress of the reaction.

The actual fineness of the granular calcium carbonate used depends on many factors. Coarser material is obviously less expensive but requires a longer reaction time, permits lower fluoride recovery, and leads to a fluorspar precipitate containing increasing quantities of unreacted carbonate. However, it also gives rise to a coarser product which is more easily separated, washed and dewatered than that obtained with finer starting material. Furthermore, the small quantities of unreacted calcium carbonate while diluting the product calcium fluoride content are not detrimental to its use in steel metallurgical operations and show an advantage in reducing or eliminating fluorine vapor losses experienced when the product is subjected to high temperatures. This volatilization of fluorine compounds occurs because of the presence of a small part of the fluoride as a fluorosilicate in the solid and also because of the interaction of acidic phosphate impurities with calcium fluoride liberating hydrogen fluoride at high temperatures.

A coarser product may also be prepared by recycling some of the separated product back to the reaction vessel thereby operating the precipitator as a crystallizer.

A further embodiment of the invention would involve the use of a mixture of coarse and fine calcium carbonate, the former being added in the early stages of the reaction thus taking advantage of the greater acidity of fresh pond water to achieve complete reaction and the finer carbonate being added at a later stage to effect a more complete recovery of fluoride.

The washing stage of the process takes advantage of the solubility of calcium phosphate salts in the acidic pond water. To a limited extent calcium fluoride also is increasingly soluble with decreasing pH. The results of some washing experiments, in which the volume of wash was the same as the volume from which the solid was precipitated, are shown in Table IIA.

TABLE IIA

| Pond Water | | | CaF$_2$ Unwashed | | | CaF$_2$ Washed | | |
|---|---|---|---|---|---|---|---|---|
| P$_2$O$_5$ | F | SO$_4$ | % CaF$_2$ | % P$_2$O$_5$ | % CaSO$_4$2H$_2$O | % CaF$_2$ | % P$_2$O$_5$ | % CaSO$_4$2H$_2$O |
| 1.89 | 1.50 | 0.99 | 55.2 | 18.1 | 8.1 | 62.8 | 12.5 | 15.5 |
| 0.94 | 0.92 | 0.42 | 62.7 | 11.0 | (9.7) | 73.8 | 7.1 | (8.0) By diff. |

Table IIB shows results of washing of precipitates by various methods developed with a view to reducing the phosphate and sulfate contents of the product. Minimizing these impurities would be advantageous in the commercial exploitation of fluorspar in metallurgical fluxing operations.

TABLE IIB

| Unwashed Solids | | | Wash | Wash Quantity wet | Washed Solid | | |
|---|---|---|---|---|---|---|---|
| % CaF$_2$ | % P$_2$O$_5$ | % SO$_4$ | Liquor | g/g solid | % CaF$_2$ | % P$_2$O$_5$ | % SO$_4$ |
| 70.9 | 8.09 | — | 1 | 5 | 77.2 | 6.36 | — |
| 70.9 | 8.09 | — | 2 | 20 | 78.5 | 6.04 | — |
| 71.4 | 8.77 | 6.30 | 3 | 5 | 79.5 | 4.87 | 6.00 |
| — | 10.97 | — | 3 | 7 | — | 3.54 | — |
| 71.4 | 8.77 | 6.30 | 4 | — | 71.5 | 8.26 | 3.50 |
| — | — | 8.42 | 4 | — | — | — | 5.75 |
| 70.2 | 8.97 | 0.69 SiO$_2$ | 5 | — | 74.8 | 6.79 | 0.20 SiO$_2$ |

(1) Pond water containing 0.954% F and 0.693% P$_2$O$_5$. Wash was performed by displacement on filter.
(2) Pond water as in (1) Wash was performed by reslurrying the wet filter cake with the wash liquor and refiltering.
(3) Pond water to which 25% H$_2$SiF$_6$ solution had been added in the volume ratio (1:9, H$_2$SiF$_6$ solution:-pond water).
(4) Ammonium carbonate (5%) solution, 5 g/g wet cake using reslurrying method followed by water wash on filter using 1 g/g of wet cake.
(5) Pond water containing 0.981% F and 0.72% P$_2$O$_5$, reslurry using 2.8 g/g wet solid followed by water wash on filter using 2.5 g/g wet cake.

Depending on raw pond water analysis, in particular the P$_2$O$_5$ to F ratio, it may be possible to produce a good quality fluorspar directly without washing. For example, a pond water sample containing only 0.86% P$_2$O$_5$ with 1.03% F and 0.3% SO$_4$ gave a precipitate consisting of 73.8% CaF$_2$ and 10.3% P$_2$O$_5$ after treatment with ground calcium carbonate. It has been found that a F/P$_2$O$_5$ weight ratio of 1.2 to 1.5 in the raw pond water gives best results in terms of maximum fluoride content in the solid product and greatest ease of solid/liquid separation. Normally, however, washing will be necessary to produce an industrially acceptable product. The method of washing chosen will depend upon the pond water analysis and the type of fluorspar desired.

The greatest reduction in the phosphate content of the product may be achieved by adding commercial fluosilicic acid (20–25% H$_2$SiF$_6$) to the pond water wash liquor. The washings may then be processed by the method already described and the fluorine values introduced as concentrated fluosilicic acid recovered as fluorspar.

The wet filter cake obtained may be dried by conventional means and thereby a fine free-flowing powder is obtained. The free moisture is removed by drying at 100° C. and the water of crystallization may be removed at 180° C. The product obtained by drying at 100° C. has a calcium fluoride content which makes it appropriate for use as a fluxing agent in steel making operations. In modern practice a briquetted solid is more desirable than a powdered material for this purpose. Using conventional sources of fluorspar a binder must usually be added to form a durable briquet. It has been discovered that the fluorspar powder as obtained using the method of the invention may be formed into a dense hard briquet in commercial briquetting equipment without the addition of any extraneous binder. Thus a product with a highly valued physical form may be manufactured in this manner with no lowering of the content of the active fluxing agent, calcium fluoride. Further study has indicated that the aluminum and phosphate impurities in the precipitated fluorspar obtained in the manner of this invention from phosphoric acid waste waters are capable of acting together as a binding agent.

The other major contaminant in the product is calcium sulfate dihydrate. This may be partially removed by washing the precipitate with an ammonium carbonate solution whereby the sulfate is dissolved and replaced by carbonate in the solid. No improvement in calcium fluoride is achieved in this fashion but the reduction in sulfate contamination is substantial. The contaminated wash liquid may be regenerated by treatment with calcium hydroxide or calcium oxide such as slaked lime or quicklime.

The separation of the fluorspar may be effected by any of the conventional means of solid-liquid separation. The stages of the process may be carried out in cheap equipment such as glass-reinforced plastic vessels, polypropylene vessels, or where possible, in a separate section of the pond system. Because of the low concentration of the ions in the pond water, large volumes must be processed to produce fluoride economically. It should be possible for the plant to operate at a capacity equivalent to the fluoride vapor loss from the phosphoric acid evaporators and reactor. This is usually in the range 25–60% of the fluoride in the rock, in the absence of recovery equipment for 20% fluosilicic acid collection.

The raw pond water feed for the plant will normally contain 0.2–1.0% sulfates. If the sulfate level is higher than 0.4%, a pretreatment step is necessary to minimize sulfate contamination in the product fluorspar. It has been discovered that the addition of the correct quantities of calcium carbonate to pond water containing 0.4 to 1.0% SO₄, as well as fluosilicate and phosphate in the usual range, results preferentially in the reduction of the sulfate level to approximately 0.4% after aging for up to 24 hours. Very little fluoride or phosphate is lost from the liquid at this stage as may be seen in Table III. Moreover, the solid is readily settlable.

TABLE III

| CaCO₃ Added | Pond Water Percent Present | | | Filtrate Percent Present | | | Time hrs. |
|---|---|---|---|---|---|---|---|
| | P₂O₅ | F | SO₄ | P₂O₅ | F | SO₄ | |
| 32 | 0.68 | 0.98 | 0.72 | 0.47 | 0.07 | 0.48 | 1 |
| 10 g/l | 0.69 | 1.00 | 0.80 | 0.69 | 0.85 | 0.38 | 12 |
| 10 g/l | 0.69 | 0.99 | 0.40 | 0.68 | 0.79 | 0.30 | 72 |
| 10 g/l | 0.83 | 0.96 | 0.54 | 0.83 | 0.84 | 0.40 | 24 |
| 10 g/l | 0.86 | 1.03 | 0.81 | 0.83 | 1.01 | 0.42 | 24 |
| 27 g/l | 0.93 | 0.92 | 0.42 | 0.66 | 0.15 | 0.30 | 24 |

Quantities of calcium carbonate in excess of what is needed stoichiometrically to precipitate the sulfate may be added without precipitating the fluoride and phosphate. A complex relationship between concentration of the various species and pH determines the point at which immediate precipitation of fluoride commences, but generally the pH is in excess of 2.0 before this happens. Thus, a satisfactory method for controlling the sulfate contamination of the product is feasible.

The economical removal of the silica from the fluorspar mother liquor is likewise possible by this process. The filtrates from fluorspar separation are metastable, containing as they do silicic acid ($H_4SiO_4$) which polymerizes very slowly under the acid conditions (pH 2.8–3.2). On standing undisturbed for 3–7 days, these filtrates turn into gels. Flocculation of the gel by vigorous agitation and/or treatment with a flocculating agent yields a separable suspension which may be settled so that 50–60% of the water containing about 20% of the silica originally in the pond water is recoverable by centrifugation, depending on the residual fluoride level after fluorspar precipitation. The F:Si mole ratio in this solution at equilibrium is approximately 5:1. The silica-rich fraction may be pumped for disposal onto the gypsum pile.

The supernatant liquid from the calcium fluoride precipitation stage may also be processed in a manner which prevents gel formation by mixing it immediately following filtration of the fluoride salt with an appropriate volume of fresh untreated pond water. In this manner, the pH of the mixture is reduced to a value in the range 1.5–2.0, wherein the rate of polymerization of silicic acid is at its slowest and the liquor is sufficiently dilute, so that when the silica does separate from solution after 5–21 days, it is in the form of a floc which sediments rapidly. A marked temperature dependence of the rate of separation of the silica has been observed. A period of 21 days is required for adequate clarification at 23° C. compared with 5 days for the equivalent separation at 32° C. In this case also the fluorine-silicon concentrations in the supernatant solution reach levels at which the F:Si mole ratio is 5:1 at equilibrium. The solution could be returned to the normal pond system. The sediment could be thickened by centrifugation and discharged on the gypsum pile or reused in the phosphoric acid plant to promote greater evolution of fluoride during evaporation. This overall method of silica disposal would lead to gradual shift in F:Si mole ratio in the pond water from 6:1 as at present to 5:1. This could have beneficial effects in a lowering of the vapor pressure of fluorine compounds over the solution, thereby reducing pollution due to fluorine emissions from the pond.

It would also be possible to feed a portion of the discharge liquor from a calcium fluoride plant operating in the manner of this invention directly to the associated phosphoric acid plant to supply the gypsum wash water needed in that plant. For periods up to 3 days the liquid is almost identical in physical characteristic to raw pond water. The extra free silica thereby introduced into the phosphoric acid solution would lead to greater evolution of fluorine compounds into the gas phase, a consequent reduction both in the fluorine lost in the gypsum byproduct and in the 52% phosphoric acid produced after evaporation. Approximately 50% of the calcium fluoride supernatant liquid could be processed in this manner in a balanced phosphate complex, the quantity being limited by the maximum quantity of water required for washing of the gypsum filter cake in the normal operation of a phosphoric acid plant.

This process also contemplates reacting the calcium fluoride supernatant liquid with a further quantity of calcium carbonate, or preferably, slaked lime or quicklime. By bringing the pH of the system to a value in the region 7–10, rapid gelling of the solution is achieved (1–3 days) at the cost of precipitating phosphate from the solution and consuming extra lime. After vigorous agitation, the gel may be centrifuged and 60–70% of the solution recovered for reuse in the pond system. The remaining silica-rich material, containing precipitated calcium phosphate, may be discharged with the phosphoric acid plant's gypsum waste.

This process may also be incorporated as part of a water treatment facility to provide clean water for discharge from a phosphoric acid complex. By treating the filtrate from the fluorspar recovery section with further qualities of calcium carbonate followed by slaked lime or quicklime, the pH of the water may be raised to values in the range 8–9 whereby the phosphate and fluoride concentrations are reduced to very low levels and the liquor may be discharged without risk of contamination of water courses, rivers or outside drainage facilities.

This invention describes a process which economically recovers byproduct fluorine as a valuable compound, and in addition fits in with the operation of an existing wet process phosphoric acid plant. It leads to minimal phosphate loss from the pond waters and handles sulfate and silica contaminants in the pond water in a satisfactory manner. Most of the water processed may be returned to the pond system or may be further treated with lime so as to be safely discharged from the complex.

What is claimed is:

1. A process for recovering a metallurgical grade fluorspar containing from about 60 to about 80% calcium fluoride from the waste water pond of phosphoric acid plants and returning the defluorinated water to the pond, said waste water having a pH of about 0.8 and containing from about 0.5 to about 1.5% fluoride, from about 0.5 to about 1.5% phosphates and less than about 0.4% sulfates, comprising the steps of:
   (1) adding sufficient calcium carbonate to the waste water to obtain an adjusted waste water solution having a pH in the range 2–3, whereby calcium fluoride is precipitated without substantial precipitation of phosphates and sulfates;
(2) washing the precipitate formed in step (1) with the waste water and with an ammonium carbonate solution to reduce the phosphate and sulfate content of said precipitate;
(3) filtering the washed precipitate obtained in step (2) to recover a metallurgical grade fluorspar and to obtain a phosphate and sulfate containing filtrate;
(4) mixing the phosphate and sulfate containing filtrate of step (3) with sufficient waste water to reduce the pH thereof to a value in the range of 1.5–2.0;
(5) sedimentating the mixture obtained in step (4) for 5–21 days to separate silica therefrom to obtain a clear solution; and
(6) returning the clear solution obtained in step (5) to the pond.

2. The process as defined in claim 1 wherein part of the filtrate of step (3) is recycled as the waste water solution of step (1).

3. The process as defined in claim 1 wherein the adjusted waste water solution obtained in step (1) is agitated to facilitate precipitation.

4. The process as defined in claim 1 wherein the precipitate obtained in step (1) is agitated in step (2) to facilitate washing.

5. The process as defined in claim 1 wherein the solution resulting from washing the calcium fluoride in step (2) is regenerated by the addition of slaked lime or quicklime.

6. The process as defined in claim 1 wherein an aqueous solution containing 20–25% fluosilicic acid is added to the waste water solution of step (2) to facilitate the reduction in phosphate content of the calcium fluoride precipitate.

7. A process for recovering a metallurgical grade fluorspar containing from about 60 to about 80% calcium fluoride from the waste water pond of phosphoric acid plants and returning the defluorinated water to the pond, said waste water having a pH of about 0.8 and containing from about 0.5 to about 1.5% fluoride, from about 0.5 to about 1.5% phosphates, and more than about 0.4% sulfates, comprising the steps of:
(1) pretreating the waste water to reduce the sulfate content thereof by adding sufficient granular calcium carbonate to said waste water to raise the pH to a value below 2.0 and aging said pretreated solution for 24 hours to cause precipitation of the sulfates and to reduce the level of sulfates to about 0.4% with minimum precipitation of calcium fluoride;
(2) adding sufficient calcium carbonate to the pretreated solution obtained in step (1) to obtain an adjusted waste water solution having a pH in the range 2–3, whereby calcium fluoride is precipitated without substantial precipitation of phosphates and sulfates;
(3) washing the calcium fluoride precipitate obtained in step (2) with the pretreated waste water solution obtained in step (1) and with an ammonium carbonate solution to reduce the phosphate and sulfate content of said precipitate;
(4) filtering the calcium fluoride precipitate washed in step (3) to recover a metallurgical grade fluorspar and to obtain a phosphate and sulfate containing filtrate;
(5) mixing the phosphate and sulfate containing filtrate obtained in step (4) with sufficient pretreated waste water to reduce the pH thereof to a value in the range 1.5–2.0;
(6) sedimentating the mixture obtained in step (5) for 5–21 days to separate silica therefrom to obtain a clear solution; and
(7) returning the clear solution obtained in step (6) to the pond.

8. The process of claim 7 wherein the mixture obtained in step (5) is centrifuged to remove silica.

9. A process for recovering a metallurgical grade fluorspar containing from about 60 to about 80% calcium fluoride from the waste water pond of phosphoric acid plants, said waste water having a pH of about 0.8 and containing from about 0.5–1.5% fluoride, 0.5–1.5% phosphates and less than about 0.4% sulfates, comprising the steps of:
(1) adding sufficient calcium carbonate to the waste water to obtain an adjusted waste water solution having a pH in the range 2–3, whereby calcium fluoride is precipitated without substantial precipitation of phosphates and sulfates;
(2) washing the calcium fluoride precipitate obtained in step (1) with said waste water solution and with an ammonium carbonate solution to remove excess phosphates and sulfates from said precipitate;
(3) filtering said washed precipitate obtained in step (2) to recover a metallurgical grade fluorspar and to obtain a phosphate and sulfate containing filtrate;
(4) adding additional calcium carbonate followed by slaked lime or quicklime to the phosphate and sulfate containing filtrate in step (3) to raise the pH thereof to a value in the range 7–10, whereby substantially all of the fluoride, phosphate and silica in said filtrate is precipitated in gelatinous precipitate;
(5) centrifuging the mixture obtained in step (4) to remove the said silica precipitate to obtain a clear solution; and
(6) returning the clear solution obtained in step (5) to the pond or discharging it.

10. A process for recovering a metallurgical grade fluorspar containing from about 60 to about 80% calcium fluoride from the waste water pond of phosphoric acid plants, said waste water having a pH of about 0.8 and containing from about 0.5–1.5% fluoride, 0.5–1.5% phosphates and more than about 0.4% sulfates, comprising the steps of:
(1) pretreating the waste water to reduce the sulfate content thereof by adding sufficient granular calcium carbonate to said waste water solution to obtain a pretreated solution having a pH below 2.0 aging said pretreated solution for up to 24 hours to cause precipitation of sulfates and to thereby reduce the concentration of sulfate to a level of about 0.4% with minimum precipitation of calcium fluoride;
(2) adding additional granular calcium carbonate to said pretreated solution obtained in step (1) to obtain an adjusted solution having a pH in the range 2–3, whereby calcium fluoride is precipitated without substantial precipitation of phosphates and sulfates;
(3) countercurrently washing and agitating the calcium fluoride precipitate formed in step (2) with said pretreated waste water solution obtained in step (1) and with ammonium carbonate to remove excess phosphates and sulfates from said calcium fluoride precipitate;

(4) filtering the washed precipitate obtained in step (3) to recover a metallurgical grade fluorspar and to obtain a phosphate and sulfate containing filtrate;

(5) adding additional calcium carbonate followed by slaked lime or quicklime to the phosphate and sulfate containing filtrate of step (4) to raise the pH thereof to a value within the range 7–10, whereby substantially all of the fluoride, phosphate and silica is precipitated in gelatinous form;

(6) centrifuging the mixture obtained in step (5) to remove said silica precipitate therefrom to obtain a clear solution; and (7) returning the clear solution obtained in step (6) to the pond or discharging it.

11. A process for recovering a metallurgical grade fluorspar containing from about 60 to about 80% calcium fluoride from the waste water pond of a phosphoric acid plant and for returning the defluorinated water to the pond, said waste water having a pH of about 0.8 and containing from about 0.5–1.5% fluoride, having a concentration of phosphates such that the fluoride to phosphate weight ratio ($F/P_2O_5$) is in the range 1.2 to 1.5 and having less than about 0.4% sulfates, comprising the steps of:

(1) adding sufficient calcium carbonate to said waste water solution to obtain an adjusted solution having a pH in the range 2–3, whereby calcium fluoride is precipitated without substantial precipitation of phosphates and sulfates;

(2) filtering the calcium fluoride precipitate obtained in step (1) to recover a metallurgical grade fluorspar and to obtain a phosphate and sulfate containing filtrate;

(3) mixing the phosphate and sulfate containing filtrate obtained in step (2) with sufficient waste water to reduce the pH thereof to a value in the range 1.5–2.0;

(4) sedimentating the mixture obtained in step (3) after 5–21 days to separate silica therefrom to obtain a clear solution; and (5) returning the clear solution obtained in step (4) to the pond.

* * * * *